United States Patent [19]

Hanson

[11] 4,070,860
[45] Jan. 31, 1978

[54] AUTOMOTIVE ACCESSORY ENGINE

[75] Inventor: Charles M. Hanson, Springfield, Va.

[73] Assignee: The United States of America as represented by the Secretary of the Army, Washington, D.C.

[21] Appl. No.: 755,878

[22] Filed: Dec. 30, 1976

[51] Int. Cl.² .......................... F01K 23/10; F02G 1/04
[52] U.S. Cl. .......................................... 60/616; 60/517
[58] Field of Search ................. 60/517, 524, 525, 526, 60/616, 618

[56] References Cited
U.S. PATENT DOCUMENTS

| 2,919,540 | 1/1960 | Percival | 60/670 |
| 3,950,947 | 4/1976 | Dirne | 60/524 |
| 4,031,705 | 6/1977 | Berg | 60/618 X |

Primary Examiner—Allen M. Ostrager
Attorney, Agent, or Firm—Nathan Edelberg; Max L. Harwell; Robert P. Gibson

[57] ABSTRACT

An apparatus that uses waste heat from an internal combustion engine to drive a heat engine which provides a mechanical output therefrom to drive automotive accessories. A Stirling engine is used as the heat engine.

3 Claims, 2 Drawing Figures

AUTOMOTIVE ACCESSORY ENGINE

The invention described herein may be manufactured, used, and licensed by the U.S. Government for governmental purposes without the payment of any royalties thereon.

BACKGROUND OF THE INVENTION

The high temperatures reached by parts of an automotive engine, especially by present day automobiles having catalytic converters, provides a good heat source for the generation of usable electrical or mechanical power by a heat engine. A heat engine used in extracting waste heat from an automobile engine, say the exhaust pipe area, offers high efficiency. One reason is that the engine performance will not be degraded since the heat extracted is waste heat which was not doing work. Efficiency is also increased because any power consuming accessories of the automobile are driven by the heat engine instead of normally being driven directly by the automobile engine or by engine-generated electricity. There are many methods of extracting waste heat from the automobile engine. Two examples are that heat can be removed from the exhaust manifold or may be extracted from the liquid cooling system by some heat exchange method.

A rough calculation of the amount of power that can be generated by the present heat engine is as follows. Assume that a 250 horsepower automobile engine is 50% efficient. This means that 500 horsepower must be generated by the burning fuel and that 250 horsepower goes into heat. Of that amount of heat, at least 80% goes out the exhaust. If 50% of that heat is delivered to a 25% efficient heat engine, the output of that heat engine would be work, W, of about $$W = (250)(0.8)(0.5)(0.25) = 25 \text{ horsepower}$$

$$W = 18,650 \text{ watts}$$

A specific embodiment of the present invention uses a Stirling engine as the heat engine.

SUMMARY OF THE INVENTION

The present invention is comprised of a device that uses waste heat from an internal combustion engine, or the like, to drive a heat engine for providing useful mechanical power therefrom to operate mechanical or electrical automobile accessories.

The device is comprised of a heat exchanger that has some heat insulator surrounding the outer portion and in which the inner portion has a heat conductor material in intimate contact with a hot exhaust pipe from an internal combustion engine. One side of the heat conductor material is further in intimate contact with a hot face at the hot volume end of a hot cylinder of a Stirling engine type heat engine. The hot cylinder has a regenerator with a plurality of open ports at the hot volume end and two seals and an enclosing end plate at a crankcase end. There is very little leakage between the seals. A plurality of apertures between two seals at the crankcase end of the regenerator allow the increased pressure of hot working fluid from the hot volume to expand through the regenerator, through the openings, and through a hollow tube to a top, or proximal volume, face of a piston in the crankcase. A working fluid volume is formed by the combination of the hot volume, the regenerator, the plurality of the apertures and the area between the two seals, the hollow part of the hollow tube, and the volume surrounding the proximal volume face of the piston.

The piston is connected by a piston rod to an outer point on the crankshaft. A regenerator rod is connected from the outer point of the regenerator enclosing end plate. Further, the crankshaft has a drive shaft connected therefrom to a driven device. The increased pressure of the working fluid forces the piston down into the crankcase, which in turn rotates the crankshaft, say in the clockwise direction, and thus the drive shaft connected thereto. At the midpoint of the piston stroke the size of the hot volume is at its maximum and then decreases as the piston approaches the bottom of the stroke and until the midpoint of the piston return stroke is reached. As the piston moves during this half-cycle of decreasing hot volume size, the working fluid is cooled in the regenerator. As the piston approaches the bottom of the stroke the pressure of the working fluid in the working volume as present on the proximal volume face of the piston becomes less than the pressure in the crankcase on the bottom, or distal side of the piston. However, inertia of the moving masses carries the piston past the bottom of its stroke, and differential pressures caused by further reduction of the working fluid pressure on the proximal side of the piston and increasing pressure on the distal side of the piston causes the piston to be forced back up toward the top of its stroke. Inertia of the moving masses also carries the piston past the top of the stroke before the working fluid pressure is again increased to start the cycle over again.

DETAILED DESCRIPTION OF THE PREFERRED EMBODIMENT

Figure 1:
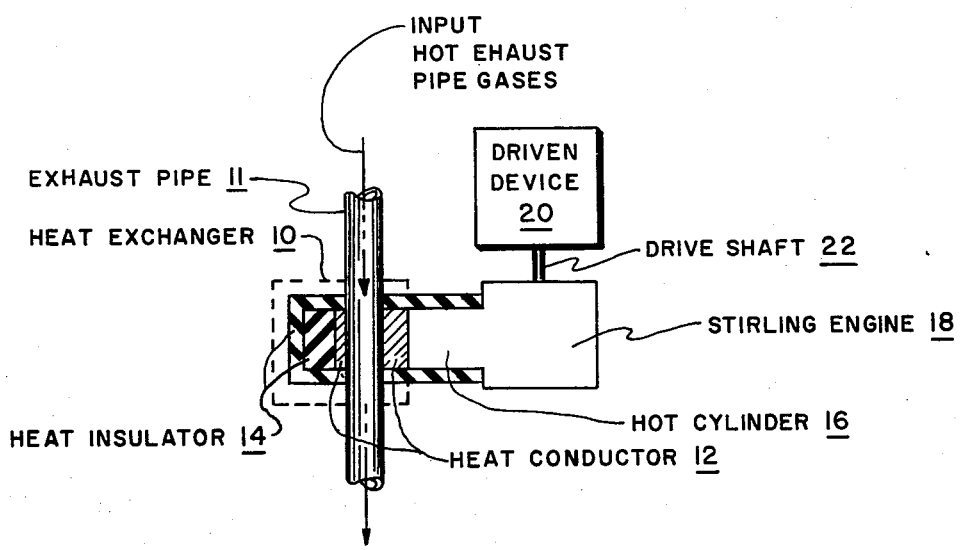
FIG. 1 shows a partially-sectional diagram of the present invention.
Figure 2:
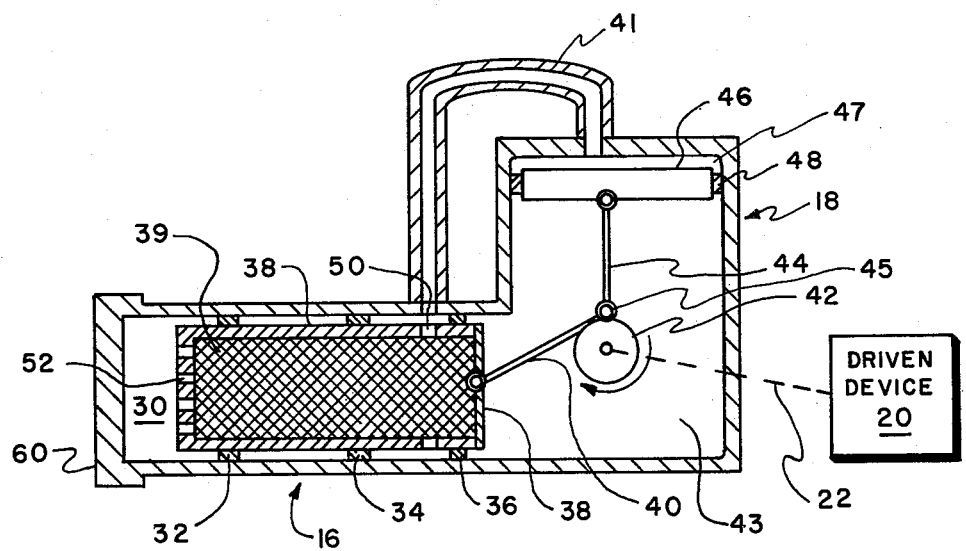
FIG. 2 illustrates the Stirling engine used as the heat engine of the present invention.

FIGS. 1 and 2 illustrate the heat engine of the present invention. The heat source for the heat engine is depicted as, but not limited to, being the hot exhaust pipe gases flowing through an automotive exhaust pipe 11. For example, hot liquids flowing in a pipe from the cooling system may be used as the heat source. Mechanical work delivered from the heat engine may be used to drive accessories, such as generator, power steering pumps, etc. in the automobile itself but such a limitation is not intended in the hot exhaust heat source heat engine as described herein below. For example, the hot exhaust gases may be derived from some stationary internal combustion engine and mechanical work produced by the heat engine be used for other means.

FIG. 1 illustrates in section the heat exchanger 10 comprised of some heat conductor material 12, such as copper, that surrounds a portion of exhaust pipe 11 and is also in intimate contact with the hot cylinder 16 of the heat engine and some heat insulator material 14 that insulates material 12 and the hot cylinder 16 from ambient air temperatures. The heat engine is described as a Stirling heat engine 18. Engine 18 has a drive shaft 22 connected at the output thereof that mechanically drives some driven device 20.

FIG. 2 better illustrates the Stirling heat engine 18 and its method of providing mechanical work at its output. Heat from the hot exhaust pipe 11 is transferred by heat conductor material 12 of the exchanger 10 to a hot face 60 of hot cylinder 16. Hot cylinder 16 has an open space inward from hot face 60 that is described as hot volume 30. Within the hot cylinder 16 is a displacer 38, having a regenerator matrix 39 therein, with a plurality of open ports 52 at the hot volume 30 end and a plurality of apertures 50 in proximity with a hollow tube connected to a proximal volume 47 on one side of piston 46. A proximal volume face of piston 46 that is discussed herein is on the volume 47 side. Piston 46 has a piston rod 44 attached thereto on a distal volume side that is further connected to an outer point 45 on the outer diameter of crankshaft 42. A regenerator rod 40 is connected between outer point 45 and displacer 38.

A working fluid volume is established by the open spaces comprised of the hot volume 30, the plurality of ports 52, the regenerator matrix 39, the plurality of apertures 50 and the enclosure between friction seals 34 and 36, the open space in the hollow tube 41, and the proximal volume 47 enclosed by friction seal 48. A crankcase 43 volume is established by the internal walls of the Stirling engine 18 housing and friction seals 36 and 48. The working fluid volume and crankcase volume vary inversely with each other during the complete cycle of operation defined by reciprocal motion of piston 46 and the clockwise rotation crankshaft 42. The crankshaft volume is always at a lower temperature than the working fluid volume that is associated with the heat source. There are continuous variations of the respective volumes as the cycle is repeated, as will be discussed herein below with reference to operation of the Stirling engine 18.

Engine 18 operates as follows. First, assume that piston 46 is at the top of the stroke as shown in FIG. 2 Hot exhaust gases pass through exhaust pipe 11 transfer heat to the heat conductor material 12 of heat exchanger 10, and therefore increase the temperature of the working fluid in hot volume 30. The increased pressure throughout the working fluid in the working volume forces piston 46 down. Motion of piston 46 imparts rotation to crankshaft 42 via piston rod 44 which is attached between piston 46 and outer point 45 on the outer diameter of the crankshaft 42. Rotation is also imparted to drive shaft 22 which is mechanically connected between crankshaft 42 and some device 20 being driven by drive shaft 22. As piston 46 moves downward toward the midpoint of its down stroke, or to the end of the first quadrant of rotation of crankshaft 42, the hot volume 30 is further increased. As the piston moves through the midpoint of the down stroke the hot volume 30 attains a maximum and begins to decrease.

As piston 46 is moved from the top of its stroke and continues moving downward past the midpoint of the down stroke, pressure within the crankcase volume 43 increases all the time that the volume 43 decreases. However, inertia of the moving masses of piston 46, piston rod 44, crankshaft 42, regenerator rod 40, displacer 38, and the driven device 20 — less the friction of seals 34, 36, and 48 — keep the outer point 45 moving through the latter part of the downward stroke and through the bottom most point before a large differential pressure on the crankcase side of piston 46 forces the piston back up during the beginning of the up stroke. From the midpoint of the down stroke to the midpoint of the returning up stroke, the hot fluid in hot volume 30 is being forced through the plurality of ports 52 and into regenerator matrix 39 where it is cooled before exiting out the plurality of small apertures 50 and hollow tube 41 and into proximal volume 47. Therefore, the average temperature of the working fluid in the working volume is reduced during his half cycle, and thus the pressure is also reduced on the proximal volume side of piston 46 during this half cycle. Piston 46 continues to be forced down, almost to the end of the second half of the down stroke, wherein inertia of the moving masses continues movement of the outer point 45 past its lowermost point against the now greater differential force in the crankcase volume side of piston 46 rather than on the working volume side.

Crankcase volume pressure drives the piston upward during the up stroke. The crankcase volume pressure is more than the working volume pressure until almost the end of the up stroke because of the continued cooling of the working fluid in the regenerator matrix 39 until the midpoint of the up stroke. The working volume pressure becomes greater than the crankcase volume pressure just prior to the end of the upstroke but inertia keeps the piston 46 moving past the top of the stroke and the cycle is started again due to the heat transfer from the hot volume 30 throughout the working volume to establish a higher differential pressure in the proximal volume than in the crankcase volume. This cycle is continuous.

Displacer 38 is prevented from wobbling within hot cylinder 16 by use of a guide ring 32. Seals 36 and 48 permit buildup of pressure differentials between the working fluid in the working volume and the fluid medium in the crankcase volume. Seal 34 prevents working fluid from bypassing the regenerator matrix 39.

From the foregoing, it should be appreciated that an apparatus has been disclosed herein in which some heat source is employed to reciprocally drive a displacer and a piston operated crankshaft for imparting rotary motion to a driven device connected to the crankshaft for effecting work. Although a specific embodiment of the invention has been disclosed herein, it is recognized that variations and modifications will occur to those skilled in the art and accordingly it is not intended that the scope of the invention be limited by the specifically disclosed embodiment.

I claim:

1. In an apparatus for converting heat energy from a heat source to mechanical energy, an apparatus comprising:

a Stirling heat engine comprised of a hot volume in a hot cylinder that is interfaced with a heat source and a heat exchanger, wherein said heat source is an automotive exhaust pipe and said heat exchanger comprises a mass of heat conductor material surrounding a portion of said exhaust pipe and is in intimate contact with said hot volume and a heat insulator material surrounding said mass of heat conductor material and said hot cylinder; and a means for cyclically varying the working fluid volume enclosed within said Stirling heat engine to drive a piston operated crankshaft having a driven device connected thereto wherein rotary motion is imparted to said driven device for doing mechanical work.

2. An apparatus as defined in claim 1 wherein said means for cyclically varying the working fluid volume comprises:

a piston mechanically connected by a piston rod to an outer point on a crankshaft within a crankcase volume;

a displacer having a regenerator matrix therein with a plurality of open ports at said hot volume end and an enclosing end plate at said crankcase volume end, wherein said displacer is mechanically connected by a regenerator rod directly to said outer point; and a hollow tube in communication between a plurality of apertures at the enclosing end plate of said regenerator matrix and the proximal volume face of said piston wherein said working fluid volume is enclosed by said hot volume, said regenerator matrix and ports therein, said apertures and said hollow tube, and said proximal volume and whereby said heat source heats said working fluid volume for causing an increasing pressure on said regenerator displacer and said proximal volume face of said piston to start rotation of said crankshaft by the combined forces from said regenerator rod and said piston rod at said outer point on said crankshaft and whereby as said crankshaft passes the end of the first quadrant said regenerator displacer is then returned back toward said hot volume during rotation of said crankshaft through the second and third quadrants in which net cooling within said working fluid occurs due to absorption of heat in said regenerator matrix and therefore decreasing pressure on said proximal volume face of said piston but wherein a proximal differential force remains across said piston from said proximal volume face to a distal volume face within said crankcase volume such that said outer point is moved to the end of the second quadrant by said proximal differential force and the inertia of the moving masses carrying said outer point through its bottom most position wherein the reduced volume of said crankcase volume creates a larger differential pressure on said distal volume face of said piston than the working fluid pressure on said proximal volume face and thus said outer point is readily rotated through the third quadrant whereupon said hot volume begins to increase again since said regenerator displacer is moved away from said hot volume during the forth and first quadrants thereby increasing the average temperature in said working fluid volume and therefore increasing pressure on said proximal volume face of said piston but whereby a distal differential force remains across said piston from said distal volume face to said proximal volume face such that said outer point is moved to the end of said fourth quadrant by said distal differential force and the inertia of the moving masses carrying said outer point through its upper most position wherein the increased volume of said crankcase volume gives way to the much increased pressure on said proximal volume face of said piston to repeat said cyclically varying working fluid volume for causing rotation of a driven device connected to said crankchaft.

3. An apparatus as set forth in claim 1 wherein said heat source is hot liquids flowing in a pipe from the cooling system and said heat exchanger comprises a mass of heat conductor material surround a portion of said pipe and in intimate contact with said hot volume and a heat insulator material surrounding said mass of heat conductor material and said hot cylinder.

* * * * *